United States Patent [19]

Thiel et al.

[11] Patent Number: 4,757,883
[45] Date of Patent: Jul. 19, 1988

[54] BRAKE DISC ARRANGEMENT, IN PARTICULAR FOR AN INTERNALLY STRADDLING DISC BRAKE FOR AUTOMOTIVE VEHICLES

[75] Inventors: Rudolf Thiel, Frankfurt am Main; Guenther Schwarz, Tuttlingen, both of Fed. Rep. of Germany

[73] Assignee: Alfred Teves GmbH, Frankfurt Am Main, Fed. Rep. of Germany

[21] Appl. No.: 915,761

[22] Filed: Oct. 6, 1986

[51] Int. Cl.⁴ .................. F16D 65/10; F16D 65/78; B21H 1/02; B22D 19/00

[52] U.S. Cl. .................. 188/218 XL; 29/159.01; 164/108; 188/264 AA

[58] Field of Search ............ 188/18 A, 71.6, 218 XL, 188/264 A, 264 AA; 301/6 CS, 6 E, 6 S, 6 W; 192/113 A, 70.12, 107 R; 29/159 R, 159.01, 159.1; 164/108, 98, 111

[56] References Cited

U.S. PATENT DOCUMENTS

| | | | |
|---|---|---|---|
| 2,655,227 | 10/1953 | Eksergian | 188/264 AA X |
| 2,940,548 | 6/1960 | Erickson | 188/18 A X |
| 3,729,067 | 4/1973 | Buyze | 188/18 A |
| 4,234,236 | 11/1980 | Inbody | 188/18 A X |
| 4,262,407 | 4/1981 | Peterson et al. | 164/108 X |

FOREIGN PATENT DOCUMENTS

| | | |
|---|---|---|
| 2033033 | 1/1972 | Fed. Rep. of Germany . |
| 2550688 | 5/1977 | Fed. Rep. of Germany ... 188/18 A |
| 2728335 | 1/1978 | Fed. Rep. of Germany . |
| 2937207 | 3/1980 | Fed. Rep. of Germany . |
| 839019 | 12/1938 | France . |
| 2452638 | 11/1980 | France ........................ 188/218 XL |
| 2498712 | 7/1982 | France . |
| 85/05661 | 12/1985 | PCT Int'l Appl. . |
| 1027686 | 4/1966 | United Kingdom . |
| 2105804 | 3/1983 | United Kingdom . |
| 2171159 | 8/1986 | United Kingdom ......... 188/218 XL |

*Primary Examiner*—Andres Kashnikow
*Assistant Examiner*—Robert J. Oberleitner
*Attorney, Agent, or Firm*—James B. Raden; Robert P. Seitter

[57] ABSTRACT

An internally straddling type disc brake for automotive vehicles is disclosed including a cast brake ring having two spaced apart sectional friction brake rings defining two braking surfaces separated by a plurality of axial ribs defining a plurality of peripheral cooling ducts between the sectional friction rings. At least two peripheral radial connecting elements extend from the ribs centrally between the sectional friction brake rings and are connected to corresponding connecting sections on a brake carrier.

2 Claims, 3 Drawing Sheets

4,757,883

BRAKE DISC ARRANGEMENT, IN PARTICULAR FOR AN INTERNALLY STRADDLING DISC BRAKE FOR AUTOMOTIVE VEHICLES

BACKGROUND OF THE INVENTION

The present invention relates to a brake disc arrangement for use, in an internally straddling type disc brake for automotive vehicles.

This invention relates to the brake disc arrangement of the type disclosed in the German patent application P No. 35 35 290.6, which is also the subject of my copending U.S. application Ser. No. 915,726 filed simultaneously herewith.

That brake disc arrangement includes a cast brake ring having two opposed braking surfaces and a brake disc carrier having at least one connecting section through which the carrier is connected to the brake ring in the region of the brake ring's outer periphery. Mounted on the cast brakae ring at one of the friction surfaces is a substantially radially extending connecting element whose outside diameter is only slightly larger than the outside diameter of the cast brake ring. The brake disc carrier is connected to radially outer sections of the connecting element by means of a weld. This known arrangement further provides for the use of several segmental connecting elements evenly distributed along the periphery and forming abutment surfaces for receiving the connecting sections of the brake disc carrier which is configured as one piece.

A shortcoming of this arrangement lies in the fact that the segmental connecting elements are cast in one solid part of the cast brake ring adjacent one friction surface and are relatively long thin members (about 2 mms thick) which contributes to increased risk that the cast wall will break out.

Another shortcoming of this prior art structure lies in effects resulting from the quenching effect of the inserted metal connecting element during the molding process, wherein the melt has been found to only partially fill the mold resulting in points of spoiled casting called (wasters). Furthermore, the intense micromotion between the inserted steel connecting element piece and the cast brake ring piece promotes crevice corrosion over the course of time.

SUMMARY OF THE INVENTION

Therefore, it is an object of the present invention to provide a brake disc arrangement which reduces the risk of the connecting element from breaking out, and which also reduces points of spoiled casting and guards against corrosion influences.

According to the invention, there is provided a brake disc arrangement wherein the wall thickness of the solid part of the cast brake ring at the friction surfaces is preserved, thus ensuring sufficient rigidity to the brake ring.

According to the invention, the connecting elements are made considerably smaller in length than the prior art connecting elements. Formerly, the larger, longer connecting elements had to be laid into the mold in a difficult and very time-consuming manner, whereas, advantageously the smaller elements according to the invention are more easily assembled in the mold and provide for less disturbances and wasters in the manufacturing process.

According to an important aspect of the invention, the connecting elements are attached to the brake ring centrally between the friction surfaces which advantageously provides for cooling air to flow past either side of the connecting element so that an even temperature distribution is obtained in the brake ring, which is in contrast to the prior art one-sided arrangement of the connecting elements which lead to an uneven distribution of temperature. Another advantage of the centrally located connecting element arrangement is that the risk of corrosion is reduced considerably due to the circulating cooling air at the connecting element. It had heretofore been a disadvantage in the prior art arrangement that dirt, salt and water could easily build up directly at the weld joint between the connecting element and carrier resulting in corrosion at the weld.

BRIEF DESCRIPTION OF THE DRAWINGS

The invention and will be better understood after reading the following Detailed Description Of The Preferred Embodiment with reference to the accompanying drawings in which.

DETAILED DESCRIPTION OF THE PREFERRED EMBODIMENT

Figure 1:
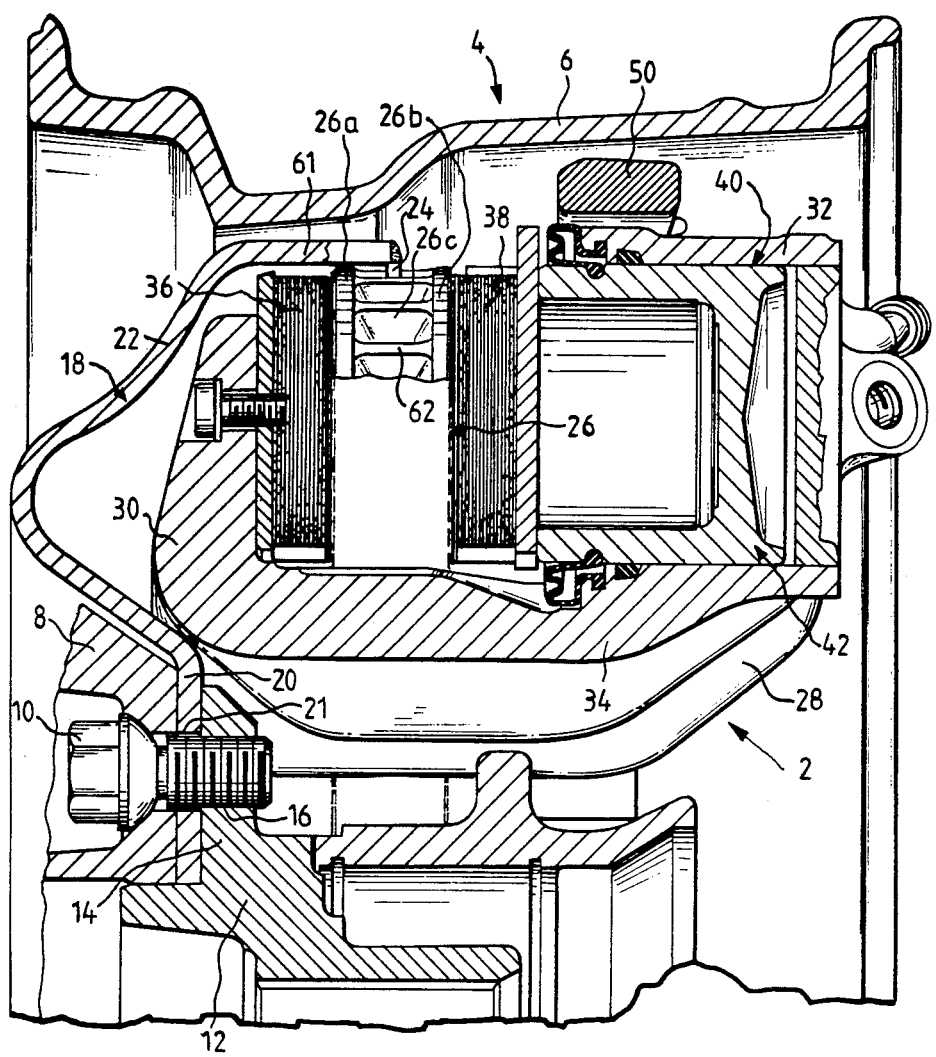
FIG. 1 is a partial longitudinal sectional view of a wheel rim including the internally straddling disc brake arrangement of the invention mounted therein.

Referring first to FIG. 1, there is shown a brake arrangement of the type known as an internally straddling disc brake 2 mounted in a vehicle wheel 4. Of the vehicle wheel, only the wheel rim 6 and part of the wheel dish 8 are shown in the drawing. The vehicle wheel 4 is secured to a wheel bearing housing 12 through the wheel dish 8 by means of a plurality of bolts 10, only one of which is shown. By means of the wheel bearing housing 12, the vehicle wheel 4 is rotatably supported in a bearing (not shown) on a spindle (not shown) which is connected to a steering knuckle of the vehicle. For this purpose, the wheel bearing housing 12 has a flange 14 in which threaded bores 16 are provided to receive the bolts 10. The bolts 10 also serve to fasten the brake disc carrier 18 to the flange 14, with the brake disc carrier 18 being arranged between the flange 14 and the wheel dish 8. As described in more detail hereinbelow, the brake disc carrier 18 has a radially inward, substantially circular fastening section 20 in which bores 21 are provided to receive the bolts 10, as well as a carrier section 22 conformed to the contour of the wheel dish 8, which contour is representative of only one configuration. The carrier section 22 forms an end or connecting section 16 extending substantially parallel to the axis of the wheel and includes connecting elements 24 secured thereto. The connecting elements 24 are arranged on cooling ribs 62 of the cooling ducts 26c between two opposed friction surfaces 26a and 26b of the friction ring 26.

The internally straddling disc brake 2 has a brake housing 28 which in longitudinal section, as shown in FIG. 1, is of substantially U-shaped configuration including two radially outwardly extending legs 30, 32 interconnected by a bridging section 34. On either side of the friction ring 26, brake pads 36, 38 are arranged which are straddled by the U-shaped brake housing 28. For operation of the disc brake, the inboard leg 32 includes a cylinder bore 40 within which a piston 42 is axially slidably mounted. The piston 42 acts directly on the inboard brake pad 38, which action generates a reaction which causes the brake housing 28 to move inwardly in the opposite direction, thereby causing the outboard pad 36 to be actuated. For this purpose, the brake housing 28 is slidably carried on a stationary brake support 50.

Figure 2:
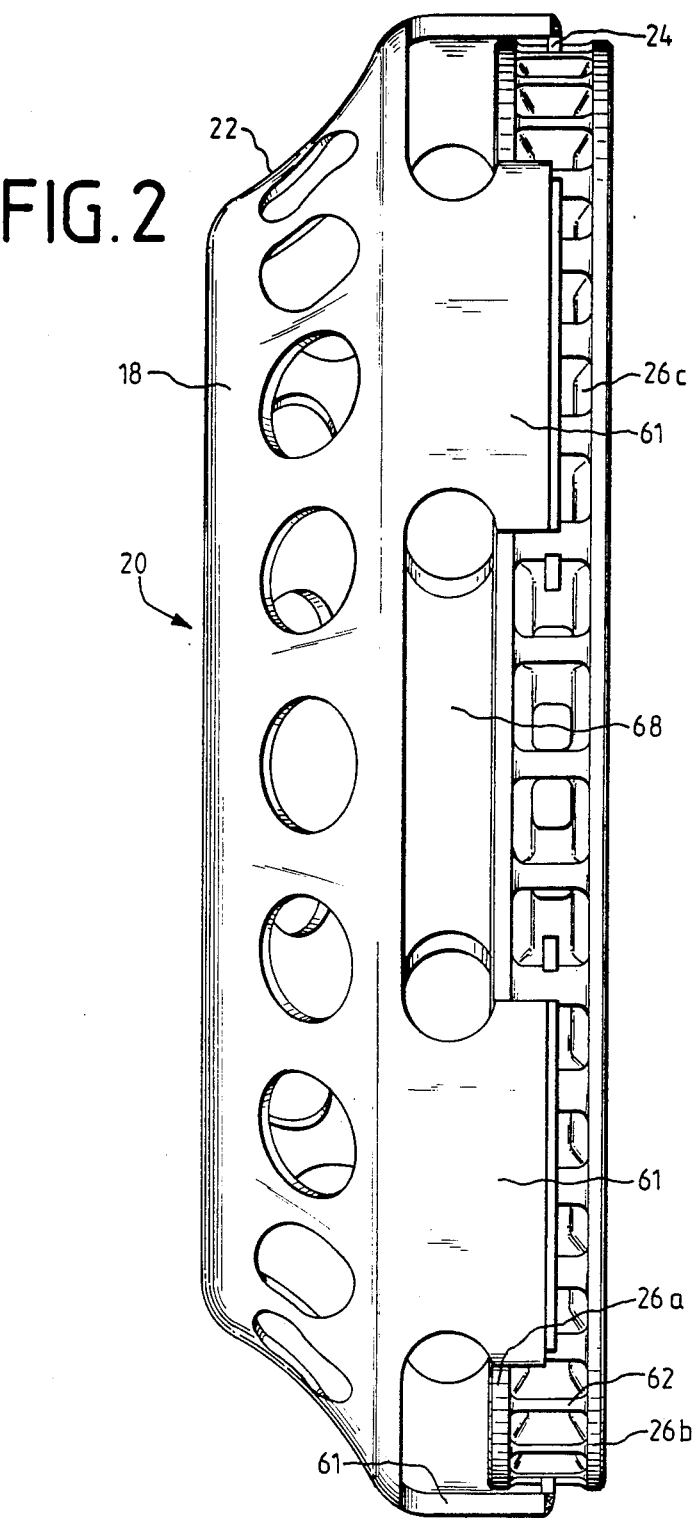
FIG. 2 is a side elevational view of the assembled disc brake according to FIG. 1.

As shown in FIG. 2 in a side elevational view, the brake disc arrangement includes a brake disc carrier 18 which is made of, for example, sheet steel. The brake disc carrier 18 has on its periphery suitably dimensioned openings or cut-outs 68 spaced at specific intervals which permit radial removal of the brake pad 36. The brake disc carrier 18 which is preferably configured as a one piece construction includes a central, substantially circular fastening section 20 with walls adjacent to the outer periphery which extend outwardly in an inclined direction and form a disc-shaped contour with the fastening section 20. The downward slope of the walls is continued in carrier sections 61 extending substantially parallel to the axis of the wheel.

The carrier sections 61 terminate above or in front of the connecting elements 24 which are cast into the cooling ribs 62 of the brake disc 26. In this arrangement, the position of the connecting elements is in about the line of symmetry of the brake disc 26. The cooling ducts 26c are formed by two axially spaced friction rings 26a, 26b connected together by a plurality of axial ribs 62.

Figure 3:
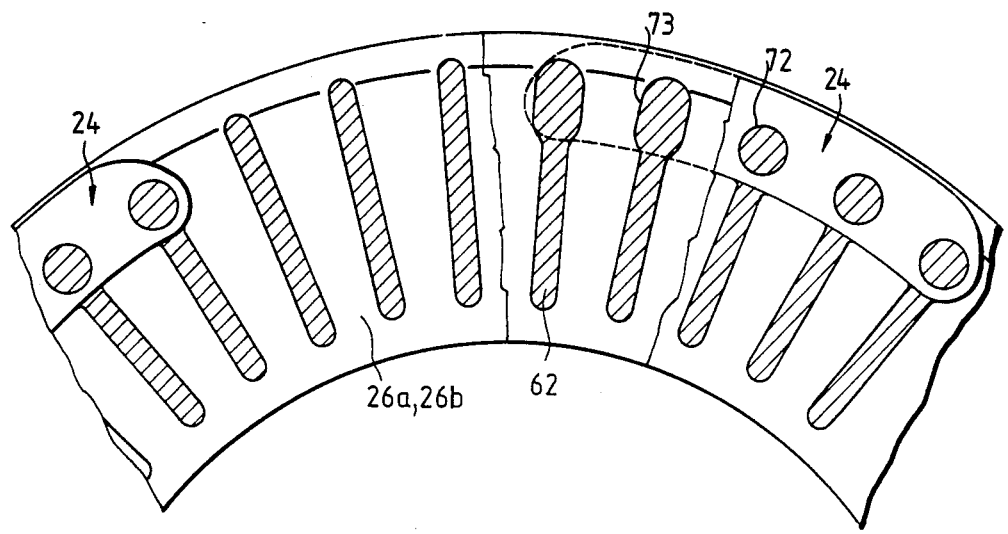
FIG. 3 is an axial cross sectional view of a portion of a friction ring blank having segmental connecting elements.
Figure 4:
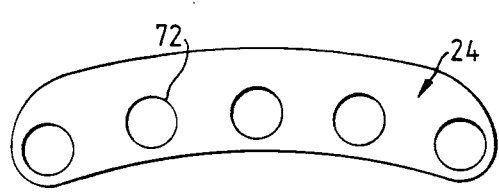
FIG. 4 is a view of one segmental connecting element.

As is shown in FIG. 3, the connecting elements 24 include openings 72 which may be of different shapes, such as an oblong hole, and which are penetrated by molten brake ring material as it is being cast around the connecting elements. Prior to welding the carrier to the connecting elements, the brake disc carrier 18, which as mentioned above is configured as one piece, is aligned so as to have its connecting sections 61 placed on top of the cast-in connecting elements 24.

The welding operation is carried out in a known fashion by means of standard welding processes.

As also shown in FIG. 3 the cooling ribs 62 in the region of the connecting elements 24 are provided with enlarged portions 73 in their upper area which imparts added rigidity between the connecting element and the cooling ribs.

What is claimed is:

1. A brake disc arrangement for an automotive vehicle, said arrangement comprising a cast brake ring member including two parallel spaced apart frictional brake rings, each of said brake rings having an annular shape with outer annular surfaces defining braking surfaces and with inner annular surfaces being adjacent each other, a plurality of generally radially extending ribs integrally cast with said inner surfaces for defining a plurality of radially extending cooling ducts, a plurality of connecting elements located on some of said ribs whereby said connecting elements are circumferentially spaced apart, each of said connecting elements including openings through which rib material extends so that said connecting elements are fixed on said ribs when said brake ring member is cast, said connecting elements extending radially of said annular surfaces to at least an outer periphery of said annular surfaces for attachment to a brake disc carrier.

2. A brake disc arrangement as claimed in claim 1 wherein said ribs include enlarged portions in the area of said openings in said connecting elements.

* * * * *